United States Patent [19]

Killion

[11] 4,023,857
[45] May 17, 1977

[54] TENSIONED AND RETRACTABLE TRUCK BODY TARPAULIN

[75] Inventor: Donald C. Killion, Great Falls, Mont.

[73] Assignee: Rose Killion, Great Falls, Mont.; a part interest

[22] Filed: Apr. 24, 1975

[21] Appl. No.: 571,081

[52] U.S. Cl. .................................. 296/98; 296/100
[51] Int. Cl.$^2$ .................................. B60J 11/00
[58] Field of Search ............ 296/98, 100, 101, 105; 160/68, 238, 265

[56] References Cited

UNITED STATES PATENTS

| | | | |
|---|---|---|---|
| 2,807,499 | 9/1957 | Duddleston | 296/100 |
| 3,041,104 | 6/1962 | Richard | 296/100 |
| 3,168,345 | 2/1965 | Roberts | 296/100 |
| 3,179,464 | 4/1965 | McBurney | 296/100 |
| 3,298,732 | 1/1967 | Openshaw | 296/100 |
| 3,515,428 | 6/1970 | Killion | 296/100 |
| 3,806,185 | 4/1974 | Brandjord | 296/98 |

Primary Examiner—Robert J. Spar
Assistant Examiner—Winston H. Douglas
Attorney, Agent, or Firm—Clarence A. O'Brien; Harvey B. Jacobson

[57] ABSTRACT

A generally horizontal load bed construction including upstanding opposite side walls is provided together with an elongated flexible cover for extension and retraction over the upper edges of the side walls of the load bed. One end of the load bed is provided with a winding member to which one end of the flexible cover is secured for winding thereon and the opposite side walls of the load bed include elongated generally horizontal tracks extending longitudinally thereof and including downwardly directed opposite end portions. A pair of upstanding support arms are secured at their upper ends to the extendible and retractable end of the cover and the lower end of each support arm includes a pair of follower members spaced on opposite sides of the support arm and engaged with longitudinally spaced portions of the corresponding track or track member. When the support arms are disposed at the end of the load bed from which the winding member is journaled, the support arms are inclined upwardly and outwardly of that end of the load bed. As the support arms move away from that end of the load bed they are upwardly shifted toward the remote end of the load bed and thereafter swing to a substantially vertical position for continued movement along the load bed in a horizontal direction. Then, as the support arms approach the end of the load bed remote from the winding member and move onto the corresponding downwardly inclined ends of the track members, the support arms are swung past the upright center positions to positions inclined upwardly and outwardly of the end of the load bed remote from the winding member after which the support arms then move in a downwardly inclined direction to their limit positions of movement away from the winding member.

9 Claims, 6 Drawing Figures

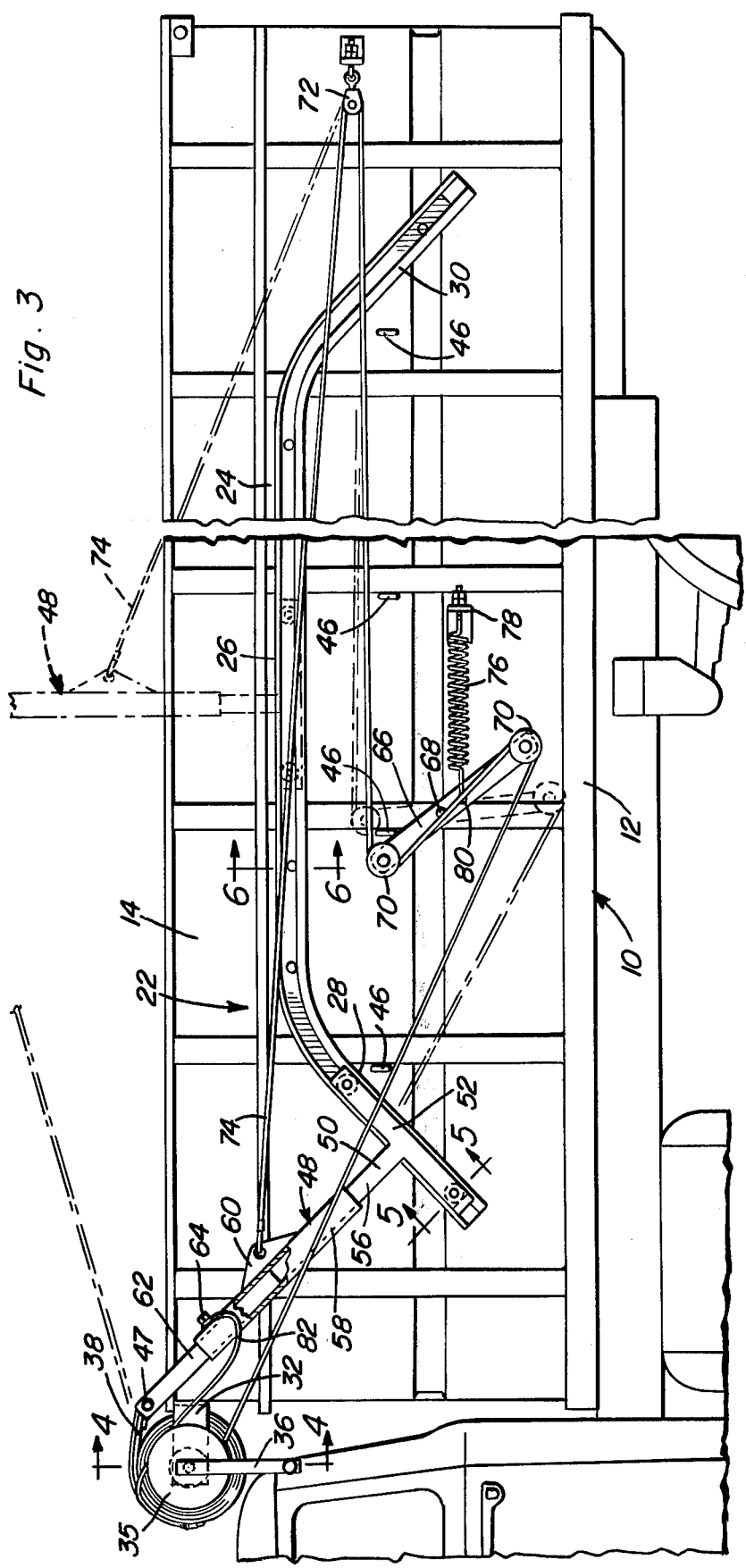
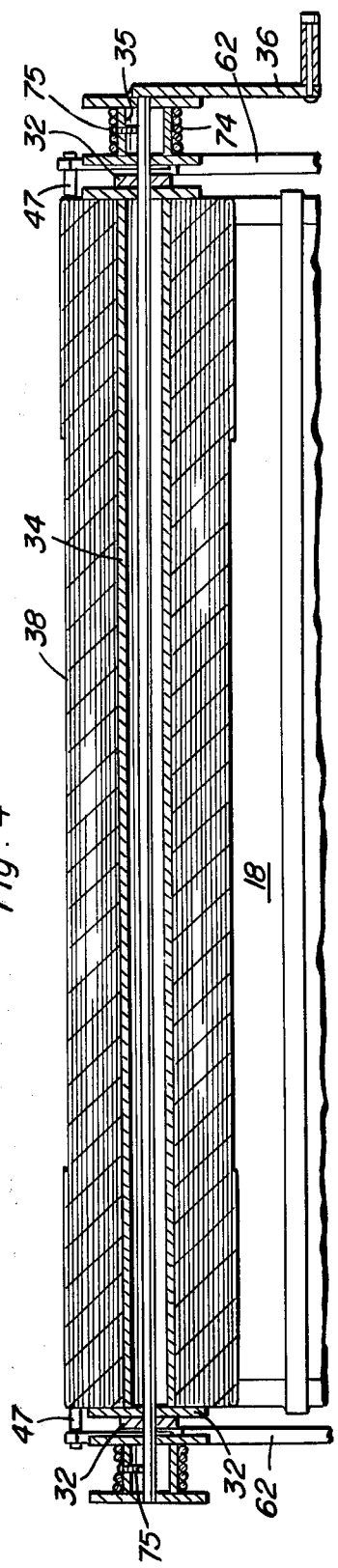

TENSIONED AND RETRACTABLE TRUCK BODY TARPAULIN

BACKGROUND OF THE INVENTION

Various structures have been heretofore designed to enable a flexible cover to be lengthwise extended over a load within a load bed projecting above the side walls of the load bed.

The prior art structure most pertinent to the instant invention is disclosed in my prior U.S. Pat. No. 3,515,428. In addition, structures for accomplishing the same general purpose are disclosed in U.S. Pat. Nos. 3,041,104, 3,168,345 and 3,179,464.

SUMMARY OF THE INVENTION

The load bed cover of the instant invention includes a winding member adapted to be journaled for rotation about an axis extending between one pair of corresponding end portions of the side walls of a load bed and an elongated flexible cover panel has one end secured to the winding member for winding the cover thereon and unwinding the cover therefrom.

There are of course several types of flexible and retractable covers for load beds, but most of these employ the use of tracks of some sort extending along the upper edges of the side walls of the load bed having followers mounted thereon to which the free end portion of the retractable cover is secured. While this type of cover will operate efficiently as long as the load placed within the load bed does not project above the upper edges of the sides of the bed, should it be desired to carry a load that projects above the sides of the bed the type of structure which merely horizontally extends a retractable cover over a load bed would engage the portions of the load projecting above the load bed side walls and thereby be prevented from moving from a retracted position to a fully extended position.

In order to overcome this drawback of most conventional sliding load bed covers, the load bed cover or tarpaulin of the instant invention includes a pair of support arms mounted on the side walls of the associated load bed in upstanding position and with the upper ends of the support arms attached to the extendible and retractable end of the cover or tarpaulin. The lower ends of the support arms are mounted on tracks extending longitudinally of the opposite side walls of the load bed and including oppositely downwardly inclined opposite end portions. Accordingly, upon initial extension of a load bed cover or tarpaulin the leading edge thereof is elevated relative to the upper edges of the side walls. Thereafter, the leading edge of the cover is horizontally extended toward the remote end of the load bed and subsequently downwardly displaced during final movement of the extendible end of the tarpaulin to the remote end of the load bed.

The main object of this invention is to provide a flexible load bed cover or tarpaulin for a load bed and which is retractable and extendible in nature.

A further object of this invention, in accordance with the immediately preceding object, is to provide a retractable load bed cover which will be operative to be extended from a stored condition at one end of the load bed up and over any portion of a load projecting above the opposite sides of the associated load bed.

Yet another object of this invention is to provide a load bed cover of the aforementioned type including a winding member upon which the load bed cover or tarpaulin may be wound into a retracted inoperative position and support arms for the free edge portion of the flexible cover of the tarpaulin which are operably connected to the load bed in such a manner that the extendible end of the cover or tarpaulin will be initially displaced upwardly, thereafter moved longitudinally of the load bed and finally displaced downwardly as the free end of the tarpaulin moves into position immediately adjacent the end of the load bed remote from the winding member.

Yet another object of this invention is to provide means operatively connecting the winding member and the support arms and driving the latter from the former in a manner such that the support arms are biased toward their operative positions at a rate greater than the rate at which the flexible cover is unwound from the winding member, thereby assuring that the flexible cover will be tensioned as it is unwound from the winding member and maintained in a tensioned condition as the flexible cover is rewound onto the winding member.

A final object of this invention to be specifically enumerated herein is to provide a flexible cover for a load bed which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged fragmentary side elevational view of the truck body as seen from the left side thereof and with the tarpaulin or cover in a fully retracted position, an intermediate partially extended position of the cover and support arms therefor being illustrated in phantom lines;

FIG. 4 is an enlarged transverse vertical sectional view taken substantially upon the plane indicated by the section line 4—4 of FIG. 3;

DETAILED DESCRIPTION OF THE INVENTION

Figure 1:
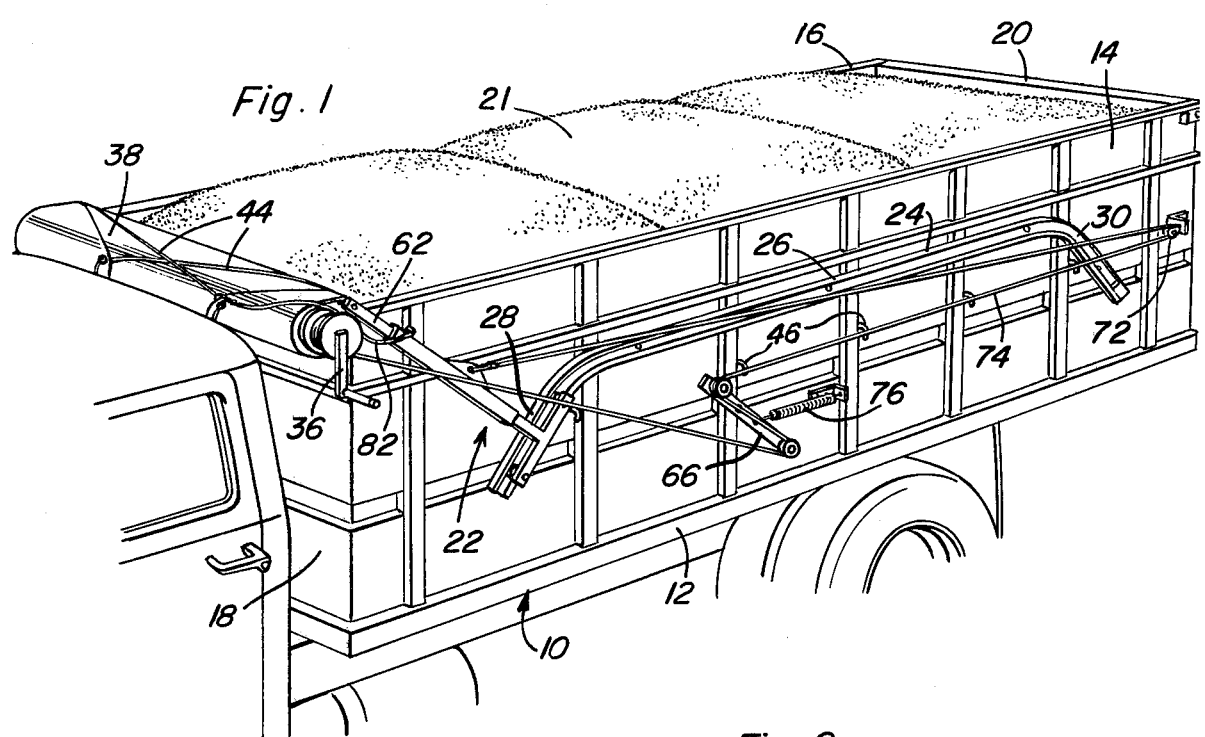
FIG. 1 is a perspective view of a truck load bed adapted to contain bulk material and with the tensioned and retractable truck body tarpaulin of the instant invention operatively associated therewith.

Referring now more specifically to the drawings, the numeral 10 generally designates a vehicle load bed including a horizontal floor 12, upstanding opposite side longitudinal side walls 14 and 16, an upstanding front wall 18 interconnecting the forward ends of the side walls 14 and 16 and a tailgate 20 extending between the rear ends of the side walls 14 and 16. The load bed 10 includes a load 21 therein of bulk material and the load is heaped, at least in some portions thereof, to an elevation above the upper marginal edges of the side walls 14 and 16.

The retractable and extendible tarpaulin or cover assembly of the instant invention is referred to in general by the reference numeral 22 and includes a pair of opposite side tracks 24 secured to and extending along the outer surfaces of the side walls 14 and 16. The tracks 24 include generally horizontal mid-portions 26 and downwardly inclined front and rear end portions 28 and 30, the tracks 24 being generally C-shaped in cross section and secured to the side walls 14 and 16 in any convenient manner.

A pair of opposite side supports 32 are supported from and project forwardly of the opposite side portions of the upper marginal edge of the front wall 18 and a winding member 34 extends between and is journaled from the supports 32, the opposite ends of the winding member including winding spool portions 35 and one end of the winding member including a crank handle 36 disposed outwardly of the corresponding support 32.

One end of an elongated flexible tarpaulin 38 is attached to the winding member 34 for winding thereon and the tarpaulin 38 is of a width at least slightly greater than the spacing between the side walls 14 and 16. In addition, the opposite side marginal portions of the tarpaulin 38 spaced slightly inwardly of the opposite ends of the tarpaulin include trapezoidal lateral extensions 40 formed integrally with the main tarpaulin body.

Figure 2:
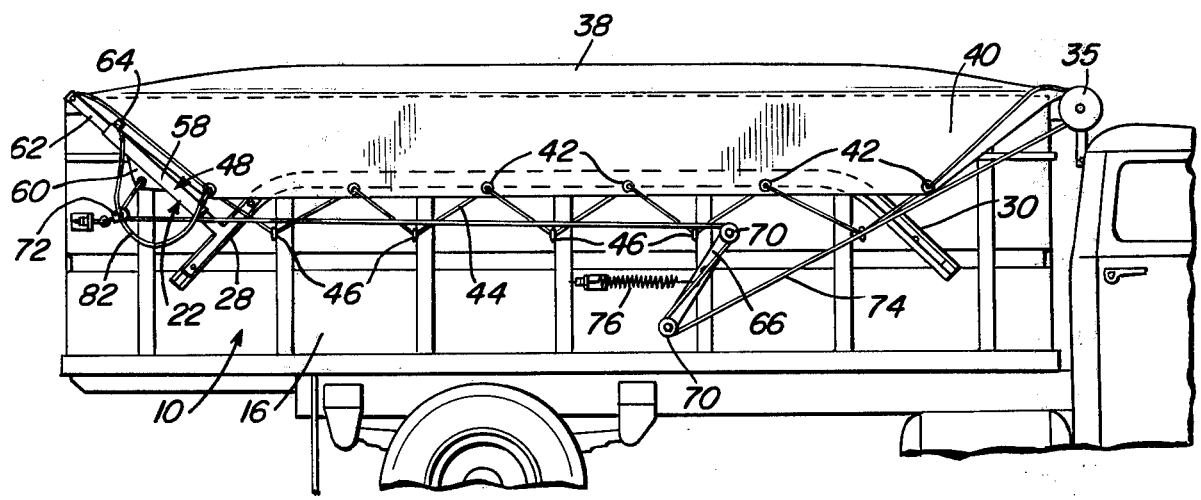
FIG. 2 is a side elevational view of the rear side of the load bed illustrated in FIG. 1 and with the retractable truck body tarpaulin in a fully extended position.
Figure 5:
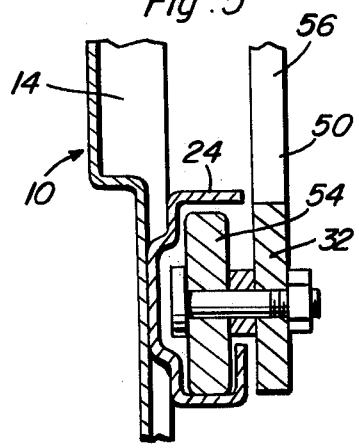
FIG. 5 is an enlarged fragmentary transverse sectional view taken substantially upon the plane indicated by the section line 5—5 of FIG. 3.
Figure 6:
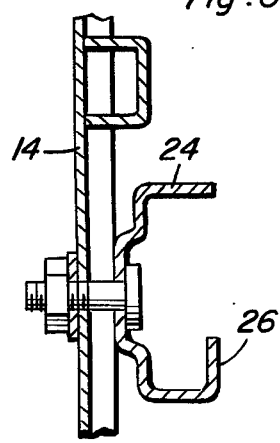
FIG. 6 is an enlarged fragmentary transverse vertical sectional view taken substantially upon the plane indicated by the section line 6—6 of FIG. 3.

As may be seen from FIG. 2 of the drawings, the tarpaulin 38 may be unrolled from the winding member 34 and lengthwise stretched over the top of the load bed 10 with the extensions 40 draped downwardly over the upper marginal portions of the side walls 14 and 16, the remote marginal edges of the extensions 40 including grommets 42 spaced therealong. Each set of grommets 42 has an elastic tension member 44 threaded therethrough releasably engageable with hook members 46 secured to and spaced along the outer surfaces of the side walls 14 and 16 in order to maintain the tarpaulin 38 including its extensions or flaps 40 in a taut condition. The forward ends of the tension members 44 extend across the front end of the tarpaulin 38 and are secured to the opposite ends of the roller or winding member 34 and the rear ends of the tension members 44 extend across the rear end of the tarpaulin 38 and are secured to the opposite sides of the free end of the tarpaulin.

In order that the extendible and retractable edge of the tarpaulin 38 may be elevated above and moved over those portions of the load 22 heaped above the upper marginal edges of the side walls 14 and 16, a pair of upstanding support arm assemblies referred to by the reference numerals 48 are provided and the upper ends of the support arm assemblies 48 include inwardly projecting bars 47 to which the corresponding opposite side portions of the extendible end of the tarpaulin 38 are secured in any convenient manner. The support arm assemblies 48 include inverted T-shaped lower end portions 50. The lower crosshead portion 52 of each lower portion 50 includes a pair of followers or rollers 54 journaled therefrom and guidingly engaged in longitudinal spaced portions of the corresponding track 24. The upstanding portions 56 of the lower portions 50 have the lower ends of a pair of tubular members 58 telescoped thereover and secured thereto. The intermediate portions of the tubular members 58 include anchor flanges 60 and the support arm assemblies 48 each includes an upper end portion 62 which is downwardly telescoped into the upper end of the corresponding tubular member 58 and secured in adjusted telescoped position therein by means of a setscrew 64.

In addition, each side wall 14 and 16 of the load bed 10 has an upstanding tensioning lever 66 pivotally supported therefrom intermediate its opposite ends by means of a pivot fastener 68. The opposite ends of each of the tensioning levers have a pair of pulley wheels 70 journaled therefrom and the rear marginal edge portion of each side wall 14 and 16 has a pulley block 72 supported therefrom.

An elongated flexible tension member 74 is provided for use on each side of the load bed 10 and corresponding ends of the tension members 74 are partially wound and secured on the winding spool portions 35 by means of fasteners 75. The free end portions of the tension members 74 extend downwardly beneath the corresponding lower pulley 70, upwardly along the associated lever 66 and over the upper pulley 70 supported therefrom. Thereafter, the free end of each tension member 74 is passed through the corresponding pulley block 72 and thereafter anchored to the corresponding anchor flange 60. Further, an expansion spring 76 is provided on each side of the load bed 10 and includes a rear end anchored to the corresponding side wall as at 78 and a forward end anchored to the corresponding lever 66 at a point spaced slightly below the corresponding pivot axis 68 thereof as at 80.

In operation, and assuming that the tarpaulin 38 is in the fully retracted position thereof illustrated in FIG. 3, if it is desired to extend the tarpaulin 38 the crank arm 36 may be orbited in a direction to wind the tension members 74 on the spool portions 35. At the same time, the winding member 34 is rotated in a direction to unwind the tarpaulin 38 therefrom. As the tarpaulin 38 is unwound from the winding member 34 and tension is increased on the tension members 74, the free ends of the tension members 74 pull rearwardly on the anchor flanges 60 in order to move the support arm assemblies 48 upwardly along the inclined end portions 28 of the tracks 24. This of course causes the leading extendible end of the tarpaulin 38 to be extended and upwardly displaced relative to the upper marginal edges of the side walls 14 and 16. Then, upon continued unwinding of the tarpaulin 38 from the winding member 34, the lower portions 50 of the support arm assemblies 48 move from the inclined portions 28 of the tracks 24 onto the forward end portions of the intermediate portions of the tracks 24. During this movement the support arm assemblies 48 are swung from forwardly and upwardly inclined positions to substantially vertical positions with the leading edge of the tarpaulin 38 at its highest elevation. Then, upon continued operation of the winding member 34 to unwind the tarpaulin 38 therefrom and wind the tension members 74 on the winding spool portions 35, the support arm assemblies 48 move downwardly along the intermediate portions 26 of the tracks 24 until the lower end portions of the support arm assemblies 48 move onto the inclined portions 30 of the track 24. During this movement the support arm assemblies 48 are swung past the upright positions to positions inclined upwardly and outwardly of the rear end of the load bed 10 and as the lower portions 50 of the support arm assemblies 48 move downwardly along the inclined portions 30 of the tracks 24 to their limit positions the leading edge of the tarpaulin 38 is moved down into position closely overlying the upper marginal edge portion of the tailgate 20. After the tarpaulin 38 has been fully extended, the extensions 40 may be unfolded so as to drape downwardly over the side walls 14 and 16 of the load bed by grasping and pulling the elongated opposite side flexible tension members 82. The tension members 82 each has one end thereof anchored to the corresponding setscrew 64 and the other end thereof anchored to the corresponding rearmost grommet 42.

When it is desired to retract the tarpaulin 38, the winding member 34 is merely rotated by orbiting of the crank arm 36 in order to wind the tarpaulin onto the winding member 34 and to unwind the tension members 74 from the winding spool portions 34. Inasmuch as the levers 66 are pivoted from the side walls 14 and 16 and under the biasing influence of the expansion springs 76, the tension members 74 and the tarpaulin 38 will be maintained taut throughout extension and retraction of the tarpaulin 38.

Inasmuch as the particular structure of a given pair of load bed side walls may dictate the elevation at which the tracks 24 may be mounted thereon, the support arm assemblies 48 are made so as to be adjustable in length and thereby enable proper meeting of the free end portion of the tarpaulin 38 and the rear end of the associated load bed when the tarpaulin 38 is in the fully extended position. In addition, the extendibility of the support arm assemblies 48 also enables adjustments to be made so as to adapt the assembly 22 for use on load beds of slightly different lengths.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an elongated vehicle load bed including opposite side upstanding longitudinal side walls having upper marginal edges, a pair of upstanding support arms for a flexible cover, elongated rigid track guide means stationarily supported from and extending longitudinally of said side walls, the lower ends of said support arms including follower means guidingly engaged with said track guide means for movement therealong, said follower means being operative to support said arms at each of the opposite ends of said load bed with said arms upwardly and outwardly inclined relative to the corresponding end of the associated load bed and to (1) upwardly elevate said support arms along upwardly inclined paths upon initial movement of said support arms away from one end of said load bed toward the other end of said load bed, (2) swing said arms to generally upright positions and guide said arms horizontally, in upright positions, toward said other end of said load bed upon further movement of said arms toward said other load bed end and (3) thereafter further swing said arms to positions upwardly and outwardly inclined relative to said other load bed end and lower said arms along downwardly inclined paths upon final movement toward said other load bed end, the upper end portions of said arms being spaced above the adjacent upper marginal edges of said side walls throughout a major portion of the movement of said support arms along said guide means, said upper end portions of said arms including means adapted to be attached to opposite side portions of one end of the flexible cover to be lengthwise extended over said load bed from one end thereof, said guide means being spaced below the upper marginal edges of said side walls.

2. The combination of claim 1 wherein said track guide structures including generally horizontal midportions and downwardly inclined opposite end portions, said follower means including horizontally spaced apart followers carried by the lower end of each of said support arms guidingly engaged with and spaced along the corresponding guide structure.

3. In combination, an elongated vehicle load bed including opposite side upstanding longitudinal side walls having upper marginal edges, elongated rigid guide tracks stationarily supported from and extending along said side walls below the upper marginal edges thereof, said guide tracks each including oppositely downwardly inclined opposite end portions and a center generally horizontal mid-portion extending between and connecting the corresponding opposite end portions, a pair of opposite upstanding support arm members for a flexible cover, each arm member including a pair of followers supported from a lower portion of said arm member and guidingly engaged with the corresponding guide track at points spaced therealong for movement along that guide track, an elongated flexible cover panel having first and second end portions, opposite side portions of said cover panel adjacent one end thereof being anchored to upper end portions of said arm members, said upper end portions of said arm members being elevated above the adjacent upper marginal edges of said side walls when said arms are supported from the center generally horizontal portions of said guide tracks.

4. The combination of claim 3 wherein said arm members include means operative to adjust the effective lengths thereof intermediate said lower and upper end portions thereof.

5. The combination of claim 3 wherein one end of said load bed, adjacent one pair of corresponding ends of the upper marginal edges thereof includes a transverse rotatable winding member to which the second end of said cover panel is attached for winding thereon.

6. The combination of claim 5 including thrust means yieldingly biasing said arm members toward the end of said load bed remote from said winding member.

7. The combination of claim 6 wherein said thrust means are connected to said arm members at points spaced therealong centrally intermediate said followers and said upper end portions of said arm members.

8. The combination of claim 6 wherein said thrust means comprise a pair of elongated tension members, a pair of expansion springs, a pair of levers and a pair of guide structures, one pair of corresponding ends of said tension members being anchored to opposite ends of said winding member for winding thereon in a direction opposite to the direction in which said second end of said cover panel is wound on said winding member, guide means carried by the ends of said side walls remote from said winding member and with which the mid-portions of said tension members are guidingly engaged, said levers being pivotally supported intermediate their opposite ends from the side walls intermediate the opposite ends thereof and including opposite end guide structures, said levers being disposed in generally upstanding relation, the end portions of said tension members remote from said one pair of corresponding ends thereof being guidingly engaged with the corresponding guide structures and having their terminal end portions anchored to the corresponding support arms, said springs being operatively connected between said side walls and the corresponding levers and yieldingly biasing said levers toward angularly displaced positions with said tension members in a tensioned condition.

9. The combination of claim 8 wherein said arm members include means operative to adjust the effective lengths thereof intermediate said lower portions and upper ends thereof.

* * * * *